United States Patent [19]

Gerber et al.

[11] Patent Number: 4,532,444
[45] Date of Patent: Jul. 30, 1985

[54] ROTATIONAL RESTRICTION LOCK FOR THE ROTOR OF A SYNCHRONOUS MOTOR

[75] Inventors: Hermann Gerber, Münchenwiler; Michel Schmutz, Murten, both of Switzerland

[73] Assignee: Sodeco-Saia AG, Murten, Switzerland

[21] Appl. No.: 491,413

[22] Filed: May 4, 1983

[30] Foreign Application Priority Data

Jun. 1, 1982 [CH] Switzerland ............... 3345/82

[51] Int. Cl.³ .................................. H02K 7/10
[52] U.S. Cl. ........................... 310/41; 310/162
[58] Field of Search ............ 310/41, 162, 165, 77

[56] References Cited

U.S. PATENT DOCUMENTS

| | | | |
|---|---|---|---|
| 3,842,296 | 10/1974 | Gerber | 310/41 |
| 3,860,841 | 1/1975 | Jullien-Davin | 310/41 |
| 4,059,779 | 11/1977 | Wistinghausen | 310/41 X |

Primary Examiner—Donovan F. Duggan
Attorney, Agent, or Firm—Ernest F. Marmorek

[57] ABSTRACT

A rotational restriction lock is formed as a one-piece restricting element which is resiliently mounted on a rotor shaft and has a hub which is always resiliently driven in rotation by the rotor throughout a small angle, spring arms which transmit the rotary movement, and movable rotation restricting elements to which the rotary movement is transmitted and the ends of which prevent the rotor from rotation in an undesired direction, but allow the rotation of the rotor in a desired direction. Adjustable abutments are provided for selecting a permissible angle of rotation of the hub.

10 Claims, 4 Drawing Figures

ROTATIONAL RESTRICTION LOCK FOR THE ROTOR OF A SYNCHRONOUS MOTOR

BACKGROUND OF THE INVENTION

The present invention relates to a rotational lock restricting rotation of a rotor of a synchronous motor to one required direction.

Arrangements of the above-mentioned general type are known in the art. One of such arrangements is disclosed, for example, in the Swiss Pat. No. 570,064. It is composed of several individual parts, and therefore its manufacture and mounting are relatively expensive.

SUMMARY OF THE INVENTION

Accordingly, it is an object of the present invention to provide a lock restricting rotation of a rotor of a synchronous motor to one direction, which avoids the disadvantages of the prior art.

More particularly, it is an object of the present invention to provide a lock of the above-described kind which is simpler than types that have heretofore been known.

In keeping with these objects and with others which will become apparent hereinafter, one feature of the present invention resides, briefly stated, in a lock of the aforedescribed kind, which has a one-piece element including a hub member with at least one sliding surface. The sliding surface is arranged to slide permanently on a rotor shaft with a friction force, at least one restricting member being supported in a fixing point, and means which are operable for resiliently connecting the restricting member to the hub member.

The thus formed rotational lock for guaranteeing the required direction of rotation of a rotor of a synchronous motor is considerably simpler than the known rotational locks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
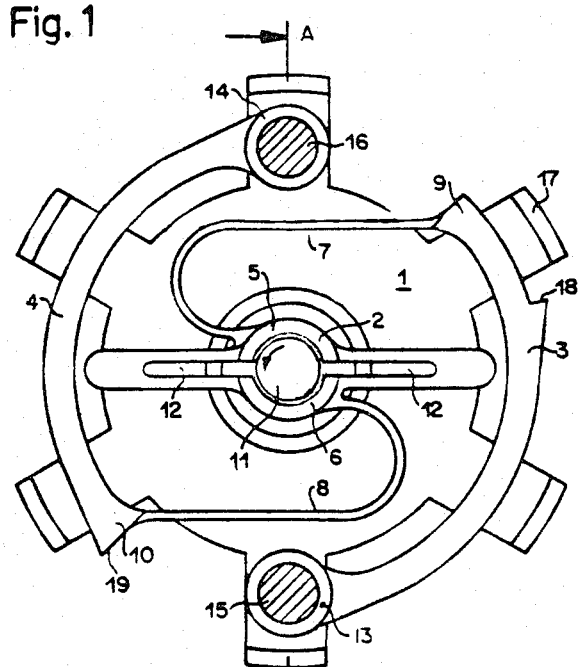
FIG. 1 is a plan view, partly in section, of a rotational lock in accordance with an embodiment of the invention.
Figure 2:
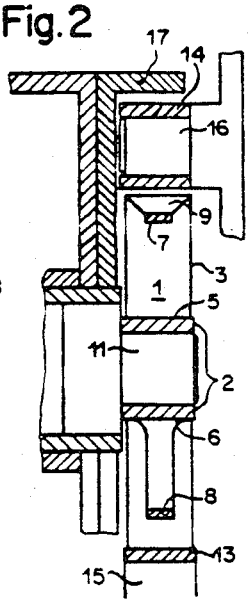
FIG. 2 is a fragmentary central sectional view, taken along the section line A—A of FIG. 1.

A rotational lock shown in FIGS. 1 and 2 is made as a one-piece part, for instance an injection-molded part. The lock 1 includes a hub or hub member 2 that has two sliding surfaces and two restricting elements 3 and 4 supported on respective hinges 15, 16, and each is resiliently connected to the hub 2.

The sliding surfaces of the hub 2 are formed by two identical bearing shells 5 and 6 which are radially resiliently pressed against one another. Spring arms 7 and 8 lead to the outer ends 9 and 10 of the restricting elements 3 and 4 which act as restriction catches. The bearing shells 5 and 6 surround the face of a rotor shaft 11 of the synchronous motor, in a resilient and sliding manner. For this purpose, the bearing shells 5 and 6 do not abut against one another, but they form between one another a longitudinal slot or gap 12 which extends at both sides of the bearing shells 5 and 6 in a plane that passes through the axis of the rotor shaft 11. The bearing shells 5 and 6 are connected to one another by respective one-piece longitudinal members 12' which extend parallel to the axis of the rotor shaft 11, each being formed with the aforesaid longitudinal slot 12. The member 12' which, so to speak, surrounds the slot 12, produces the spring force which presses both bearing shells 5 and 6 against each other. The bearing shells 5 and 6 produce, when rotor shaft 11 is rotating always such a small friction force which attempts to rotate the entire lock 1, as will be described hereinbelow.

The rotary movement of the hub 2 is transmitted to the outer ends 9 and 10 of the restricting elements 3 and 4, which in form are pivotably supported at their respective inner ends 13 and 14 at fixed points on stationary pins 15 and 16, respectively. The axes of the pins 15 and 16 are parallel to the axis of the rotor shaft 11.

Instead of two restricting elements 3 and 4 of the above-described embodiment, only one restricting element may alternately be provided. For reasons of a load equilibrium, however, it may be advantageous to provide two such members and to support them so that the axes of both pins 15 and 16 lie in the same plane as the axis of the rotor shaft 11.

Because of the friction of the bearing shells 5 and 6 with the rotor shaft 11, the whole hub 2 performs during starting of the synchronous motor a rotary movement which is transmitted with the aid of the spring arms 7 and 8 to the restricting elements 3 and 4 serving as locking catches. In one direction of rotation of the rotor shaft 11, which is the clockwise direction in FIG. 1 of the drawing, the restricting members 3 and 4 pivot from inside outwardly and penetrate hence into the region of rotary pole plates 17 of the synchronous motor. Thereby they hinder any further rotation of the rotor shaft 11. In the opposite direction of rotation (counter-clockwise as seen in FIG. 1), the restricting elements 3 and 4 pivot with the aid of their spring arms 7 and 8 inwardly, release the pole plates 17 and therefore also the rotor shaft 11. By this arrangement, the synchronous motor can start in only one direction of rotation of the rotor shaft 11.

The restricting elements 3 and 4 each have a catch-like tooth 18 and 19, respectively, at their contact points with the pole plates 17. The tooth 19 of the restricting element 4, which is the left hand element in FIG. 1 of the drawing, is arranged at the outer end 10. In contrast thereto, the tooth 18 of the restricting element 3 is offset relative to the distance of the pole plates 17 by a one-half pitch of the pole plates. It is therefore provided that any possible reverse rotation path until lock of the rotor shaft 11 is achieved by an equal amount and can amount only to one-half of the pole plate pitch. Further, it is also possible in this way to maintain better the most favorable braking location of the rotor required for the starting rotary torque in the desired direction of rotation relative to the position of the permanent magnets in the synchronous motor, than would be the case in the event of identically designed restricting elements 3 and 4. An increased starting reliability is thereby ensured.

Figure 3:
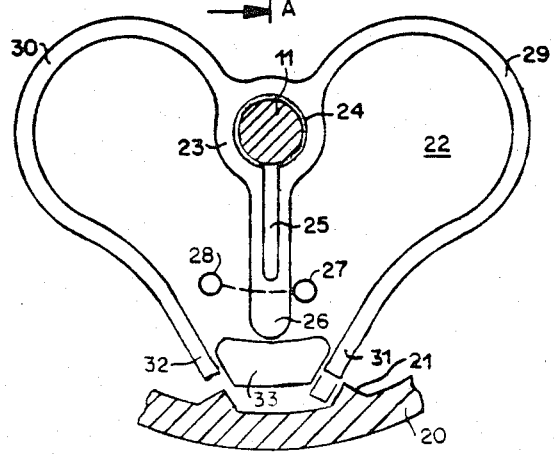
FIG. 3 is a plan view, partly in section, of a rotational lock in accordance with another embodiment of the present invention.

In the embodiment of FIG. 3, the pole plates 17 are replaced by a rotor 20 that is composed, for example, of synthetically bonded magnetic particles and has an inner locking toothing 21 in which a rotation restricting member 22 engages. The restricting member 22 also has a hub or hub member 23 with an opening 24, which forms a surface on which the rotor shaft 11 slides resiliently. For this purpose, a slot 25 extends radially from the opening 24 and forms together with the opening 24 a key hole shape. The length of the slot 25 is greater than the diameter of the rotor shaft 11. The hub 23 is thereby endowed with the elasticity required for a resilient sliding of the rotor shaft 11 to take place. Consequently a small rotary torque is continuously transmitted from the rotor shaft 11 to the hub 23. The part of the hub 23 which surrounds the slot 25 forms a projecting rib 26 which serves for limiting any possible rotary movement of the hub 23. Two abutments 27 and 28 for limiting movement of the rib 26 are provided for this purpose.

At least one finger 29 which is springy because of its great free length forms a restricting element and also is part of the one-piece rotation restricting member 22. The shape of the hub 23 is not mandatory and it can be also of the type shown for the hub 2 in FIG. 1. The finger 29 abuts with its free end 31 against a stationary cam 33. During rotary movement of the rotor shaft 11 or of the hub 23 in the correct direction, the finger 29 slides along the cam 33, but in the event of any false direction of rotation it engages the restricting toothing 21, as shown in FIG. 3 at the end 31 by a dashed line. The end 31 is then clamped between the restricting toothing 21 and the cam 33, and thus prevents the rotor 20 from rotation. In the other direction of rotation the free end 31 releases the rotor 20.

The rotation restricting member 22 with only one finger 29 of FIG. 3 as well as the rotation restricting member of FIGS. 1 and 2 make possible a preselection of the permissible direction of rotation. During mounting, the selection between two possible positions in which the rotation restricting member 22, or 1, is placed on the rotor shaft 11 determines the direction of rotation.

An advantageous preselection of the direction of rotation also takes place when the restricting member 22 of FIG. 3 is provided with two fingers 29 and 30 which form the rotation restricting elements. The fingers 29 and 30 abut with their ends 31 and 32 the same stationary cam 33. The fingers 29 and 30 are arranged mirror-symmetrically relative to the longitudinal axis of the gap 25 of FIG. 3. At least one fixed abutment 27 serves for limiting any possible rotary movement of the hub 23 and determines the direction of rotation.

In the embodiment of FIG. 3, the right abutment 27 is located closer to the rib 26 than the left abutment 28 in the inoperative position of the rotation restricting member 22. When the rotor shaft 11 and thereby the a hub 23 rotate in counter-clockwise direction (FIG. 3), the rib 26 abuts the abutment 27 and the end 32 cannot engage with the restricting toothing 21. In the opposite direction of rotation, however the rib 26 pivots so that the rotor 20 is stopped by the end 31 of the finger 29. Thus, the synchronous motor can run only in a counter-clockwise direction (FIG. 3).

Figure 4:
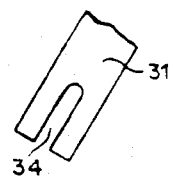
FIG. 4 is a fragmentary elevational view of a portion shown in FIG. 3.

In order to provide for a resiliently dampened braking of the rotor 20 which may have commenced rotation in the wrong direction, it may be advantageous to provide the free ends 31 and 32 (FIG. 3) with a slot 34 as shown on a portion of the free end 31 in FIG. 4. The thus slotted portion will additionally act as a dampening spring.

When both abutments 27 and 28 are arranged to be displaceable while maintaining their distance from one another, then the arrangement can serve in a simple manner for preselection of the direction of rotation.

The above-described rotation restriction locks can be manufactured as a single part, for example by injection molding of thermoplastic material, in a very simple manner and can be fitted onto the motor during mounting without any adjustment. Because of the sliding properties of the injection molded materials and the relatively large surfaces which slide on the motor shaft 11, a very high service life and extremely low wear takes place.

It will be understood that each of the elements described above, or two or more together, may also find a useful application in other types of constructions differing from the types described above.

While the invention has been illustrated and described as embodied in a rotational restriction lock for a rotor of a synchronous motor it is not intended to be limited to the details shown, since various modifications and structural chambers may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A rotational restriction lock for a rotor of a synchronous motor to assure a required direction of rotation, said motor including at least one fixed point, comprising in combination,
    said rotor including a shaft,
    a one-piece rotation restricting member, including a hub member having at least one surface in resilient frictional engagement with said shaft,
    at least one movable rotation restricting element movably supported on said fixed point, and
    means resiliently connecting said restricting element to said hub member.

2. A rotational restriction lock as claimed in claim 1, wherein the motor has rotatable pole plates in a region thereof, said restricting element having inner and outer ends and being formed as a locking catch, said shaft defining an axis, said connecting means including at least one spring arm which connects said hub member near said outer end to said restricting element; and further comprising a stationary pin arranged at said fixed point pivotally supporting said restricting member near said inner end, said pin having an axis which is parallel to that of the rotor shaft and transmitting a rotary movement of said hub by means of said spring arm as a turning movement to said restricting element so that when the rotor shaft attempts to rotate in one direction of rotation, said restricting member moves about said pin from inside outwardly into the region of the rotatable pole plates of the synchronous motor and restrains the rotor shaft from further rotation, whereas when the rotor shaft attempts to rotate in a direction opposite to said one direction, said restricting element turns inwardly about said pin with the aid of said spring arm, and released the rotor shaft for rotation in said direction opposite to said one direction.

3. A rotational restriction lock as claimed in claim 1, wherein the rotor has a restricting toothing, said restricting element being formed by a resilient finger arranged on said hub, and further comprising a stationary cam, said finger being arranged so that its free end abuts said cam, slides along said cam during rotation of the rotor shaft, and engages the restricting toothing of the rotor which runs immediately near said cam during any attempted undesired direction of rotation so as to be clamped between said cam and said restricting toothing, whereas during rotation in a desired direction the free end of said finger releases the rotor for rotation in a direction opposite to said undesired direction.

4. A rotational restriction lock as claimed in claims 2 or 3, wherein said restricting member is mountable on the rotor in such a manner as to render possible the selection between two positions of said restricting member, one of said positions permitting rotation of the rotor in one direction, but inhibiting rotation thereof in a direction opposite to said one direction, the other of said positions permitting rotation of the rotor in a direction opposite to said one direction, but inhibiting rotation thereof in said one direction.

5. A rotational restriction lock as claimed in claim 1, wherein said hub member has a sliding surface formed by two radially oppositely arranged resilient bearing shells which form a gap therebetween.

6. A rotational restriction lock as claimed in claim 5, wherein said hub member has an opening formed with said and includes a part which forms a projecting rib, said projecting rib having a radial slot formed as a key hole and having a radial length which is greater than the distance of said shaft.

7. A rotational restriction lock as claimed in claim 2, wherein there are arranged two stationary pins having axes which are parallel to the axis of the rotor shaft, said restricting member including two restricting elements each supported on a respective of said pins.

8. A rotational restriction lock as claimed in claim 7, wherein said two restricting elements make contact with the pole plates and have at their respective contact points a catch-like tooth, the tooth of one restricting element having a different location compared to that of the other restricting element, and being off-set relative to a distance between the pole plates by a one-half pitch of the pole plates.

9. A rotational restriction lock as claimed in claim 6, wherein said rotation restricting member includes two supporting members formed as two fingers which abut with their free ends a cam and are arranged mirror-symmetrically relative to a longitudinal axis of said slot, and further comprising at least one stationary abutment for limiting a possible rotary movement of said hub member.

10. A rotational restriction lock as claimed in claim 9, and further comprising a second abutment, said abutments being displaceable so as to determine a pivoting range of said hub member.

* * * * *